US00RE35028E

United States Patent [19]

Casebolt et al.

[11] E Patent Number: Re. 35,028

[45] Reissued Date of Patent: Aug. 29, 1995

[54] SAFETY HARNESS WITH ADJUSTABLE FRONT D-RING

[75] Inventors: Scott C. Casebolt, St. Paul Park, Minn.; Brian K. Fisk, Portland, Oreg.

[73] Assignee: D B Industries, Inc., Red Wing, Minn.

[21] Appl. No.: 173,651

[22] Filed: Dec. 22, 1993

Related U.S. Patent Documents

Reissue of:

[64] Patent No.: 5,203,829
Issued: Apr. 20, 1993
Appl. No.: 782,575
Filed: Oct. 25, 1991

[51] Int. Cl.[6] ..... A62B 35/00; B64D 17/30

[52] U.S. Cl. ..... 119/857

[58] Field of Search ..... 119/770, 857, 907; 244/151 R; 182/3, 4

[56] References Cited

U.S. PATENT DOCUMENTS

| | | | |
|---|---|---|---|
| 1,697,363 | 1/1929 | Losey . | |
| 1,857,375 | 5/1932 | Hoffman . | |
| 1,939,062 | 12/1933 | Knight | 244/21 |
| 2,130,724 | 9/1938 | Lewis | 227/49 |
| 3,424,134 | 1/1969 | Rosenblum | 119/96 |
| 3,452,374 | 7/1969 | Turner | 9/313 |
| 3,757,744 | 9/1973 | Pravaz | 119/96 |
| 4,090,683 | 5/1978 | Derrien et al. | 244/151 |
| 4,197,816 | 4/1980 | Lusch | 119/96 |
| 4,553,633 | 11/1985 | Armstrong et al. | 182/3 |
| 4,632,217 | 12/1986 | Markwell et al. | 182/3 |
| 4,712,513 | 12/1987 | Huppertsberg | 119/96 |
| 4,746,084 | 5/1988 | Strong | 244/151 |
| 5,183,007 | 2/1993 | Vincent | 119/857 X |
| 5,203,829 | 4/1993 | Fisk et al. | 119/96 |

FOREIGN PATENT DOCUMENTS 2039209 8/1980 United Kingdom .

*Primary Examiner*—Robert P. Swiatek
*Attorney, Agent, or Firm*—Moore & Hansen

[57] ABSTRACT

The safety harness includes a shoulder strap, a waist strap and a seat strap. The seat strap includes end portions that wrap around the upper portions of the right and left legs, respectively. The shoulder strap is effectively continuous, having one break where the first and second shoulder strap portions are buckled to each other. The shoulder strap buckle is also the location for adjusting the effective length of the shoulder strap to fit the person's torso. The waist strap includes a buckle location where the safety harness is fastened to the person wearing it, the waist strap buckle permitting easy donning of the safety harness.

41 Claims, 4 Drawing Sheets

SAFETY HARNESS WITH ADJUSTABLE FRONT D-RING

Matter enclosed in heavy brackets [ ] appears in the original patent but forms no part of this reissue specification; matter printed in italics indicates the additions made by reissue.

BACKGROUND OF THE INVENTION

1. Technical Field

The present invention relates generally to harnesses worn by humans, particularly those harnesses worn for safety purposes that may be connected as by a rope or cable to a building or other structure for breaking the descent of humans falling from great heights, and also those harnesses worn with parachutes.

2. Background Information

Safety harnesses of the type presently disclosed have been long known and commonly used, as, for example, by aviators, construction workers, mountain climbers, and even parents who wish to prevent their infants from escaping a baby carriage. Harnesses of this type generally include several straps that wrap around the torso of the person wearing the harness. These straps must be of adjustable length to conform to the bodies of different sized persons, but the process is frequently painstaking, the adjustment of one strap frequently necessitating the readjustment of one or several others.

Further, the process of donning the safety harness has often been at best confusing, and at worst quite difficult, especially for those who wear such a safety harness only infrequently. These harnesses frequently must be stepped into or pulled down over the head. The multiplicity of straps and buckles, each of which is designed to be positioned in a particular place and in a particular sequence, may be daunting, and may require some difficult physical maneuvers to ensure that they are properly positioned and fastened. Further, such harnesses are frequently uncomfortable to wear, or may inhibit the movements of the person wearing them. Sometimes this may lead to a person such as a worker in a dangerous position failing to wear the safety harness because they feel it is too great a hindrance to the performance of their duties.

Such harnesses that include a front lanyard ring for fastening a position-maintaining device such as a rope or cable frequently result in the front lanyard ring being positioned very high on the torso of the person wearing the harness, sometimes causing injury to the head of that person if they should fall. Prior art devices that illustrate this problem include U.S. Pat. No. 4,197,816, issued to Lusch on Apr. 15, 1980. This harness, which may be worn about either the upper or lower portion of the torso, may shift to a position very high on the chest and shoulders of the person wearing it when suspended by a rope or cable from the front lanyard ring, and could thereby result in harm or injury to that person. This may be true even when the straps of the harness are properly adjusted to the person wearing it.

U.S. Pat. No. 3,424,134, issued to Rosenblum on Jan. 28, 1969, discloses the common arrangement of a fixed lanyard mounting ring at the rear intersection of the shoulder straps of the harness. Also disclosed is a belt-mounted front ring to which may be attached a lanyard snap fastener or other fastening device. However, the vertical position of the front ring may not be adjusted with respect to the torso. The shoulder straps of the harness must be adjusted in two places to conform its shape to that of the torso of the person wearing the harness. To put on the harness, a person must first step into and through the two leg loops before putting their arms through the openings defined by the shoulder straps.

Another harness of this type is disclosed in U.S. Pat. No. 4,712,513, issued to Huppertsberg on Dec. 15, 1987. This reference discloses the use of a single, discontinuous shoulder strap that permits adjustment at the point of the discontinuity, allowing adjustment of the entire torso portion of the harness. However, Huppertsberg teaches a harness with shoulder straps extending vertically from the hips to the shoulders of the person wearing the harness. When the person rotates or bends to the side, these vertical portions may bind or restrict the person's freedom of motion. Further, this reference does not allow for adjustment of the vertical position of the front lanyard ring, as the front ring is maintained in position by a transverse chest strap sewn to the opposing shoulder portions of the shoulder strap. Also, the position of the front ring is high on the torso of the person wearing the harness, subjecting that person to the possibility of being struck or injured on or about the head by the balancing device to which the front ring may be attached, in the event the person should lose their balance and fall.

The safety harness of the present invention overcomes the difficulties described above and affords other features and advantages heretofore not available.

SUMMARY OF THE INVENTION

The safety harness disclosed herein is of extremely simple construction and yet highly effective design. The harness includes a shoulder strap, a waist strap and a seat strap. The seat strap includes end portions that wrap around the upper portions of the right and left legs, respectively. The shoulder strap is effectively continuous, having one break where the first and second shoulder strap portions are buckled to each other. This buckle location is the location for adjusting the effective length of the shoulder strap to fit the person's torso.

It is preferred that the front lanyard mounting ring be positioned near the stomach area of the person wearing the harness, somewhat above the person's waist. The primary use of the front lanyard mounting ring is for work positioning, such as to stabilize the person wearing the harness by connecting the front ring to a cable or other fixed structure as by a carabiner. A person also may be suspended from the front ring, although the design of the harness renders the rear lanyard ring more suitable for fall protection.

Three buckles are required for fully donning the safety harness. The first is part of the waist strap. The other two are for the portions of the seat strap that wrap around the right and left legs, respectively. Each of the three buckles is a pass through buckle having a male portion and a female portion. The buckles are easy to use yet secure when fastened.

It is an object of this invention to provide a safe, secure safety harness that is easy to don, comfortable to wear and easily manufactured. The buckle on the waist strap is the main buckle for donning the safety harness. Its convenient location makes the safety harness easier to don. It is a further object of this invention to provide a safety harness having an adjustable front lanyard mounting ring for work positioning that may be effectively positioned by the person wearing the harness in a location that is functional yet unlikely to cause injury in the event of a fall or loss of balance.

It is a further object of this invention to provide a safety harness that takes advantage of the natural tendency of webbing to drape over the object on which it is positioned. In so doing, the harness remains in a proper and effective position for protecting the person wearing it without the need for additional straps or buckles, which can add weight to the safety harness and make it more difficult to don. Similarly, it is also an object of this invention to provide a safety strap having shoulder strap portions that do not tend to slide over and off of the shoulder of the wearer when that person bends to the side. Rather, the centrally connected shoulder and waist straps cause the shoulder strap going over the lowered shoulder to be retained in position by the portion of the waist strap on the opposite side of the worker.

Another object of the invention is the improved weight distribution of a load such as a tool pouch fastened to the safety harness. In common use, a load will sometimes be attached as by a carabiner to the hip region of the safety harness to keep tools accessible to the worker wearing the safety harness. Rather than putting most of the load from the tool pouch on the shoulder of the worker on the side where the pouch is located, the present invention distributes the load over both shoulders, tending to lessen the fatigue experienced by the worker.

Other objects and advantages of the invention will become apparent from the following detailed description and from the appended drawings in which like numbers have been used to describe like parts throughout the several views.

DESCRIPTION OF THE PREFERRED EMBODIMENT

Figure 3:
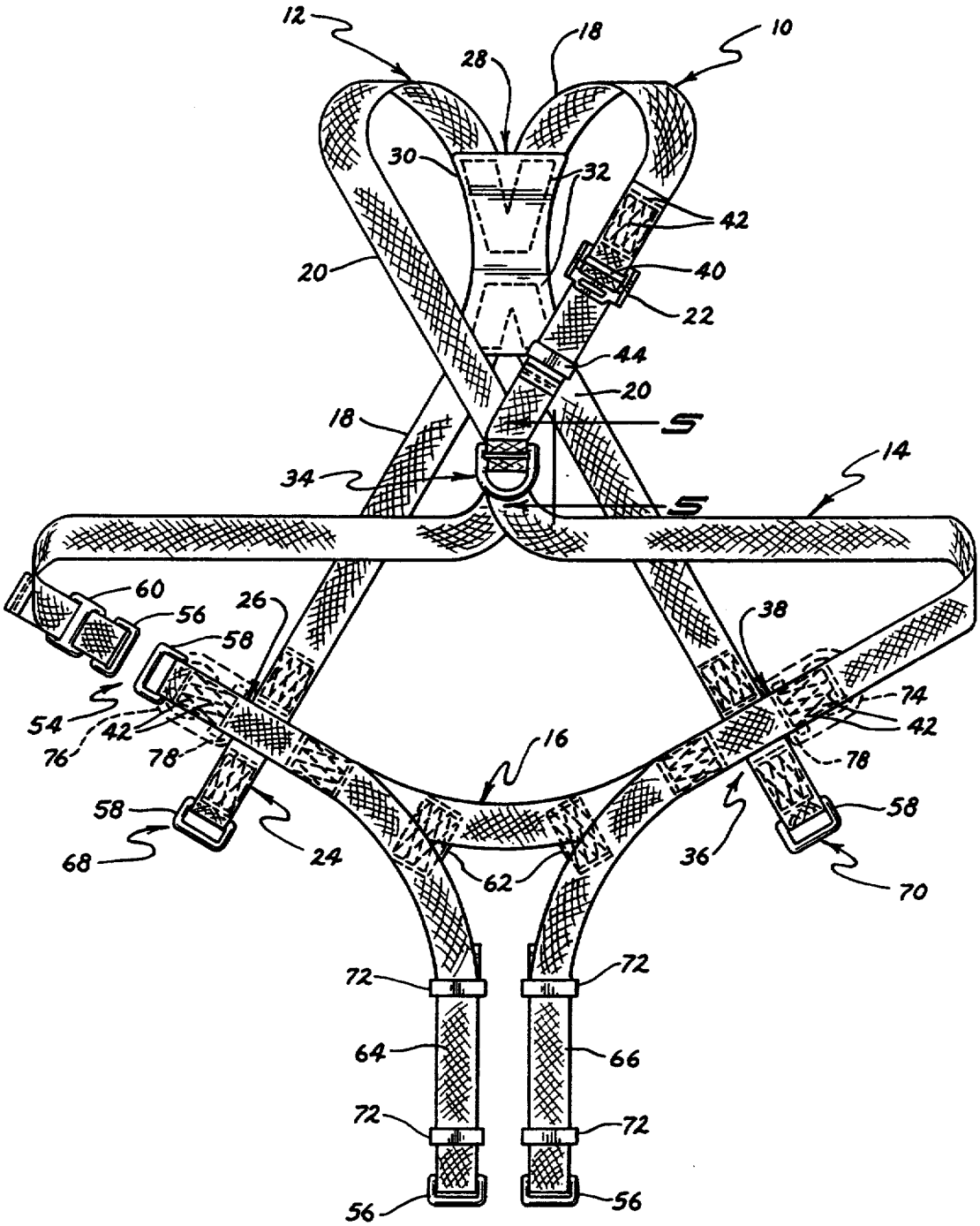
FIG. 3 is a front elevation of a disassembled safety harness ready to be donned for use.

With reference to the drawings, and in particular to FIG. 3, the safety harness is generally indicated by reference numeral 10. Safety harness 10 includes shoulder strap 12, waist strap 14 and seat strap 16. In the preferred embodiment, the effective length of each of these straps may be adjusted by the person P wearing safety harness 10, although safety harness 10 may be fabricated with straps having a fixed length. Shoulder strap 12 includes first strap segment 18 and second strap segment 20.

Figure 1:
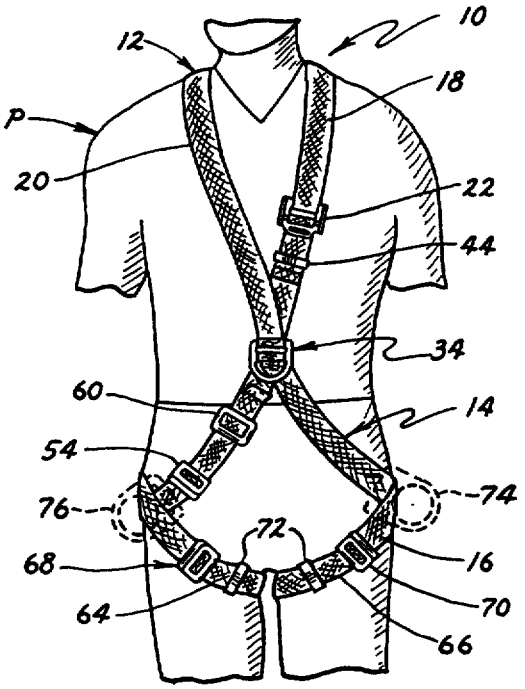
FIG. 1 is a front elevation of the safety harness in normal use.
Figure 2:
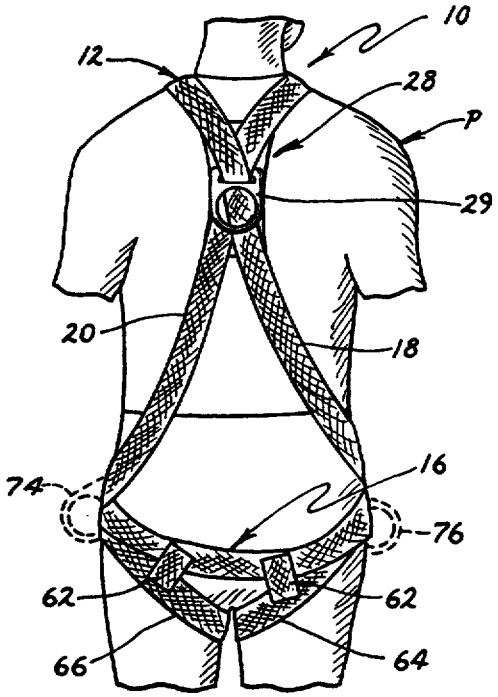
FIG. 2 is a rear elevation of the safety harness in normal use.
Figure 5:
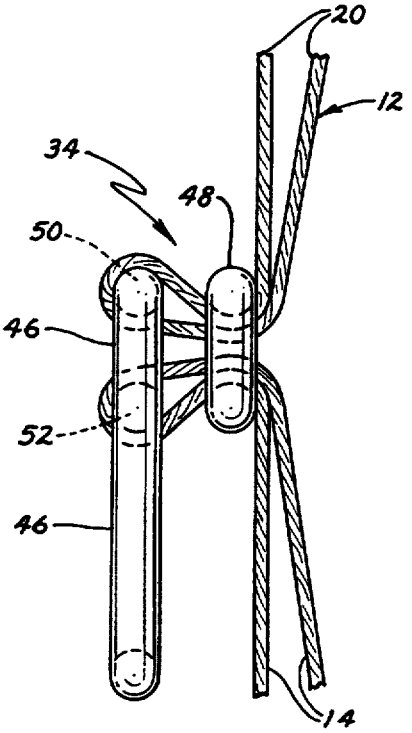
FIG. 5 is a section view taken along line 5—5 of FIG. 3.
Figure 6:
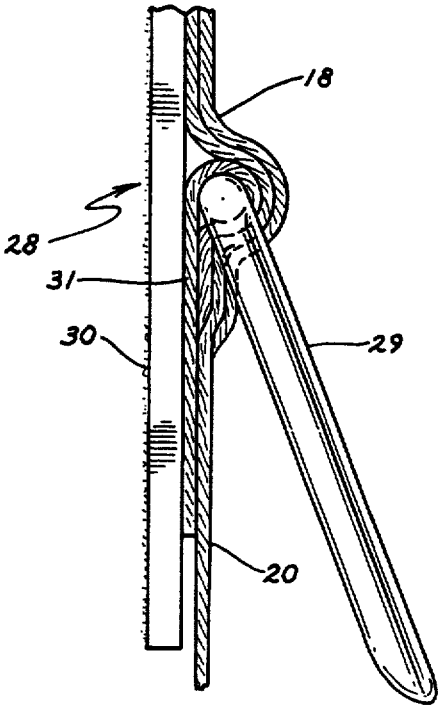
FIG. 6 is a section view taken along line 6—6 of FIG. 4.
Figure 4:
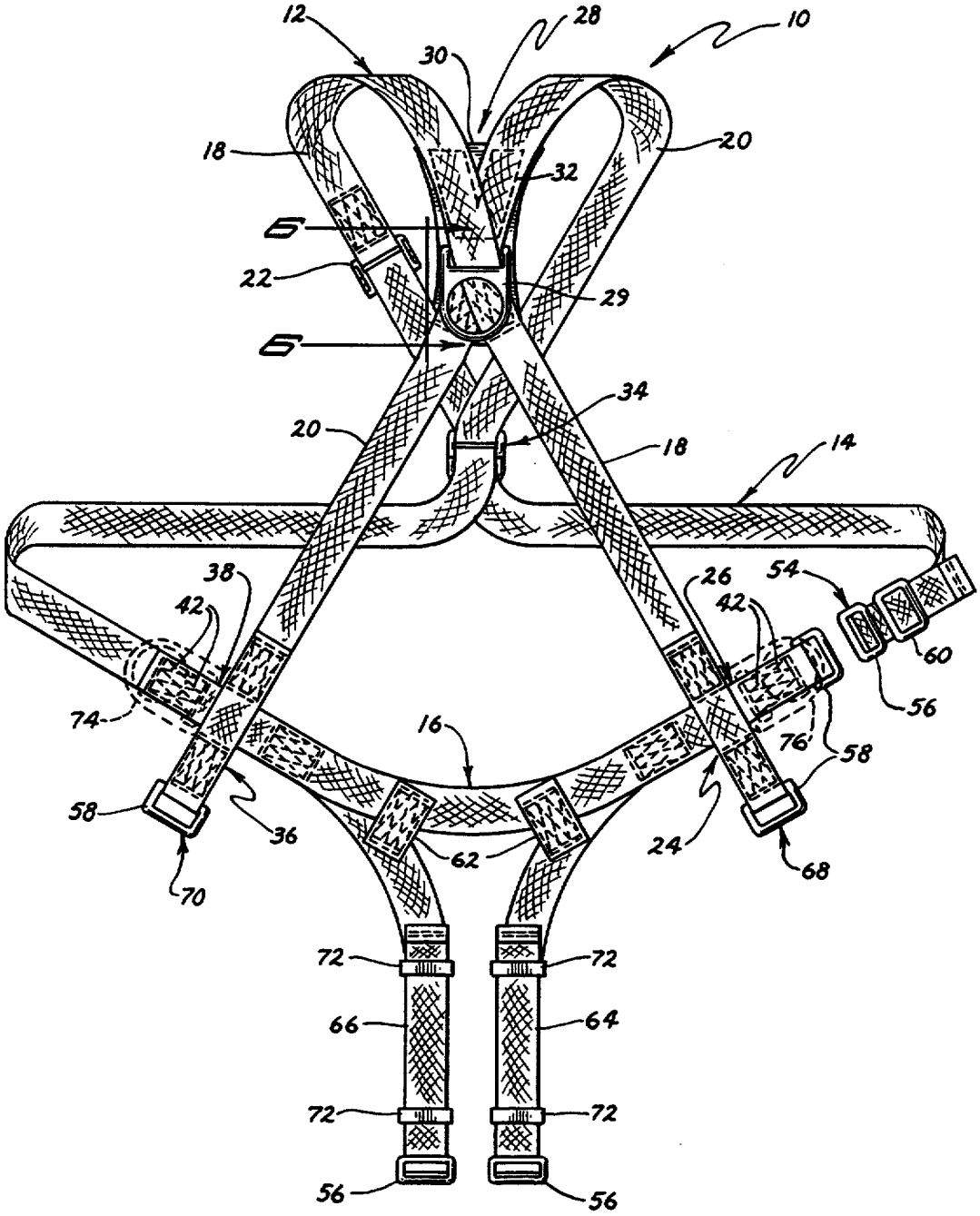
FIG. 4 is a rear elevation of a disassembled safety harness ready to be donned for use.

As illustrated in FIGS. 1 and 2, first strap segment 18 passes over the left shoulder of the person P wearing safety harness 10, while second strap segment 20 passes over the person's right shoulder. As illustrated in FIGS. 1 and 3, first strap segment 18 and second strap segment 20 of shoulder strap 12 are joined by shoulder strap adjuster 22. As best shown in FIGS. 3 and 4, shoulder strap 12 includes a first end region 24 that intersects and interlaces with the folds of a first intermediate portion 26 of seat strap 16. First end region 24 of shoulder strap 12 coincides with the first end of first strap segment 18. First strap segment 18 then intersects and crosses over second strap segment 20 at rear suspension assembly 28, which includes a harness back pad 30 (FIG. 6), preferably made of leather, to which first strap segment 18 and second strap segment 20 are both attached as by stitching 32. Also attached to back pad 30 of rear suspension assembly 28 is a rear lanyard mounting ring in the form of D-ring 29. D-ring 29 is fastened to back pad 30 as by attachment webbing 31 (FIG. 6). First strap segment 18 then continues to shoulder strap adjuster 22, as shown in FIG. 3, where it joins second strap segment 20. Second strap segment 20 then passes through front slide assembly 34 (FIG. 5) before turning back on itself at an angle of not greater than approximately 90 degrees. Shoulder strap 12 then continues back to rear suspension assembly 28, where second strap segment 20 intersects first strap segment 18, and terminates at second end region 36, which coincides with the second end of second strap segment 20. Second end region 36 of shoulder strap 12 intersects and interlaces with the folds of a second intermediate portion 38 of seat strap 16.

As discussed above, it is preferred that first strap segment 18 and second strap segment 20 are attached to back pad 30 of rear suspension assembly 28 as by stitching 32, thereby securing rear suspension assembly 28 in a fixed location. However, the position of rear suspension assembly 28 may also be adjustable, although it is important that the range of motion of rear suspension assembly 28 be limited to prevent it from moving too close to the head of person P. This is because in the event of a fall, if rear suspension assembly 28 were able to move too far upward toward the head of person P, the person's neck could be pinched between rear suspension assembly 28 and front slide assembly 34, resulting in injury to the person P.

The fabric used for shoulder strap 12, waist strap 14, seat strap 16 and attachment webbing 31 is preferably a polyester webbing, approximately $1\frac{3}{4}$ inches wide. First strap segment 18 of shoulder strap 12 is approximately $56\frac{3}{4}$ inches long, and second strap segment 20 of shoulder strap 12 is approximately $85\frac{3}{4}$ inches long. Waist strap 14 is approximately 35 inches long, and seat strap 16 is approximately 123 inches long. Attachment webbing 31 is approximately eight inches long. For purposes of identifying the various straps when donning the safety harness 10, it is preferred that shoulder strap 12 and waist strap 14 be made of yellow polyester webbing, while seat strap 16 be made of black webbing, although any contrasting colors permitting easy identification of the various straps is sufficient.

As noted, the second end of first strap segment 18 joins the first end of second strap segment 20 at shoulder strap adjuster 22. The effective length of shoulder strap 12 may be changed by altering the length of second strap segment 20 using shoulder strap adjuster 22. The shoulder strap adjuster. 22 illustrated in FIG. 3 is of a conventional design, although any such device may be used that facilitates the simple, secure adjustment of the length of a harness strap. The second end of first strap segment 18 passes through an opening 40 in adjuster 22, then wraps around a first spanning member (not shown) before folding back on itself, where it is fixedly positioned as by stitching 42. (As shall be seen, stitching 42 is frequently relied on for retaining segments of safety harness 10 in position, It is preferred that where such stitching is called for, there should typically be approximately five to seven stitches per inch.) The first end of second strap segment 20 passes through opening 40 in adjuster 22, then wraps around a second spanning member (not shown) before folding back on itself, where it is kept in position by a plastic loop keeper 44.

As noted, after adjustably fastening to adjuster 22, second strap segment 20 of shoulder strap 12 passes through front slide assembly 34 before partially folding back on itself and passing over the right shoulder of the person P wearing safety harness 10. Also passing through front slide assembly 34, which may be repositioned with respect to the torso of the person P wearing safety harness 10, is waist strap 14. As illustrated in FIG. 5, front slide assembly 34 includes D-ring 46 and generally rectangular adjuster link 48. Second strap segment 20 of shoulder strap 12 loops around first cross piece 50 of D-ring 46 after passing through the opening formed by adjuster link 48. Similarly, waist strap 14 loops around second cross piece 52 of D-ring 46 after passing through the opening formed by adjuster link 48. To adjust the vertical position of front slide assembly 34, adjuster link 48 is loosened by sliding it away from D-ring 46 along second strap segment 20 and waist strap 14. Second strap segment 20 and waist strap 14 may then be repositioned about first cross piece 50 and second cross piece 52, respectively, until D-ring 46 is in the desired location. Finally, adjuster link 48 is slid toward D-ring 46 and snugged up to it, causing front slide assembly 34, including D-ring 46, to maintain securely a constant relative position on the person P wearing safety harness 10.

As illustrated in FIGS. 3 and 4, waist strap 14 fastens on its first end to an intermediate region of seat strap 16 adjacent second intermediate portion 38 as by stitching 42. The second end of waist strap 14 releasably fastens to an intermediate region of seat strap 16 adjacent first intermediate portion 26 as by first pass through buckle 54. First pass through buckle 54, as do other such buckles included on safety harness 10, includes a male, insertable portion 56 and a female, receiving portion 58. The second end of waist strap 14, to which insertable portion 56 of first pass through buckle 54 is attached, includes means for adjusting the effective length of waist strap 14. Means for adjusting the length of waist strap 14 includes a waist strap adjuster 60 that permits the secure length adjustment of waist strap 14. When adjusting the effective length of waist strap 14, the position of front slide assembly 34 may easily be relocated by following the procedure described above for adjusting the vertical position of front slide assembly 34. After loosening adjuster link 48 (FIG. 5), waist strap 14 may be repositioned about second cross piece 52 of D-ring 46 until front slide assembly 34 is appropriately centered on the front of the torso of the person P wearing safety harness 10. As described, adjuster link 48 is then snugged up to D-ring 46, securely maintaining front slide assembly 34 in an appropriate position.

As discussed; seat strap 16 includes first and second intermediate portions 26, 38, respectively. As may be seen in FIGS. 3 and 4, seat strap 16 folds back on itself in the areas of first and second intermediate portions 26, 38, respectively, where seat strap 16 connects with waist strap 14. Stitching 42 is indicated on areas of first intermediate portion 26 of seat strap 16 on either side of its intersection with first end region 24 of shoulder strap 12. Similarly, stitching 42 is indicated on areas of second intermediate portion 38 of seat strap 16 on either side of its intersection with second end region 36 of shoulder strap 12. Likewise, stitching 42 is indicated on portions of first end region 24 of shoulder strap 12 on either side of its intersection with first intermediate portion 26 of seat strap 16. And stitching 42 is indicated on portions of second end region 36 of shoulder strap 12 on either side of its intersection with second intermediate portion 38 of seat strap 16. Each of these pairs of stitching 42 indicate locations where portions of shoulder strap 12 or seat strap 16, respectively, have been folded back upon themselves. Thus, between each pair of stitching 42 there exists a double layer region of the respective strap. These double layer regions are interlaced before completing the stitching process to provide secure, permanent locations for fixed attachment of the respective straps one to another. Since shoulder strap 12 and seat strap 16 are not sewn directly to each other, the force on the intersections of shoulder strap 12 and seat strap 16 of a sudden jolt caused by a falling body reaching the end of a safety line fastened to rear suspension assembly 28 is spread out over eight sets of stitching 42, rather than only two, greatly reducing the likelihood that any stitches might separate, which could result in the failure of safety harness 10.

Spacing tabs 62 are stitched to portions of seat strap 16 to ensure the proper location of the right and left leg portions 64, 66, respectively, of seat strap 16 that wrap around the legs of the person P wearing safety harness 10, as illustrated in FIGS. 1 and 2. Right and left leg portions 64, 66 comprise the first and second end regions of seat strap 16, although separate straps may be employed to replace right and left leg portions 64, 66, the separate straps being appropriately fastened to seat strap 16 as by stitching. Spacing tabs 62 are made of the same polyester webbing as seat strap 16, and are approximately $1\frac{3}{4}$ inches wide by three inches long.

At the ends of right and left leg portions 64, 66, respectively, are insertable portions 56 of second and third pass through buckles 68, 70, respectively. Male, insertable portions 56 connect to female, receiving portions 58 of second and third pass through buckles 68, 70, located on first and second end regions 24, 36, respectively, of shoulder strap 12. As shown in FIG. 1, second and third pass through buckles 68, 70 are connected generally on the front of the legs of the person P wearing safety harness 10. The effective length of right and left leg portions 64, 66 may be adjusted by repositioning seat strap 16 between plastic keepers 72, similar to loop keeper 44. It must be emphasized that all three pass through buckles 54, 68, 70 be fastened when using safety harness 10 for the proper operation of the harness.

As illustrated in FIGS. 1, 2 and 4, left and right auxiliary D-rings 74, 76, drawn in phantom, also may be provided for work positioning, serving generally the same purpose as front D-ring 46. Auxiliary D-rings 74, 76 each include a crossbar 78 captured between the folds of first and second intermediate portions 26, 38, respectively, of seat strap 16. Additionally, a fabric reinforcing segment (not shown) also may be sewn into safety harness 10 in these regions to provide added strength and support.

To don safety harness 10, the person P first puts their head between first strap segment 18 and second strap segment 20 of shoulder strap 12 from the left side. In so doing, rear suspension assembly 28 should be positioned on the back of person P, and front slide assembly 34 should be positioned near the stomach of person P. First pass through buckle 54 on waist strap 14 should then be fastened by passing insertable portion 56 through receiving portion 58. Person P should then reach between their legs and grasp left leg portion 66 and fasten third pass through buckle 70. Person P then reaches between their legs and grasps right leg portion 64 and fastens second pass through buckle 68. Right and left leg portions 64, 66 should then be adjusted snugly. Similarly, shoulder strap 12 should be adjusted snugly at shoulder strap adjuster 22, and waist strap 14 also should be adjusted snugly at the insertable portion 56 of first pass through buckle 54. The left and right sides of shoulder strap 12 should be adjusted to the same length, and front slide assembly 34 should be centered on the lower chest of person P.

Figure 7:
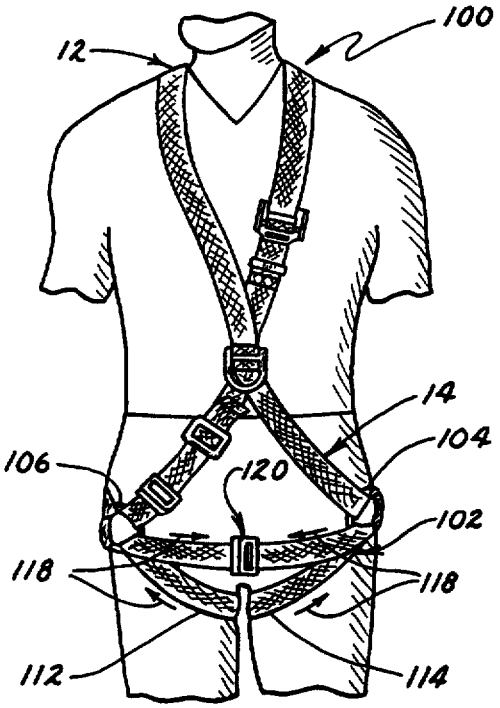
FIG. 7 is a front elevation of an alternative embodiment of the safety harness in normal use.
Figure 8:
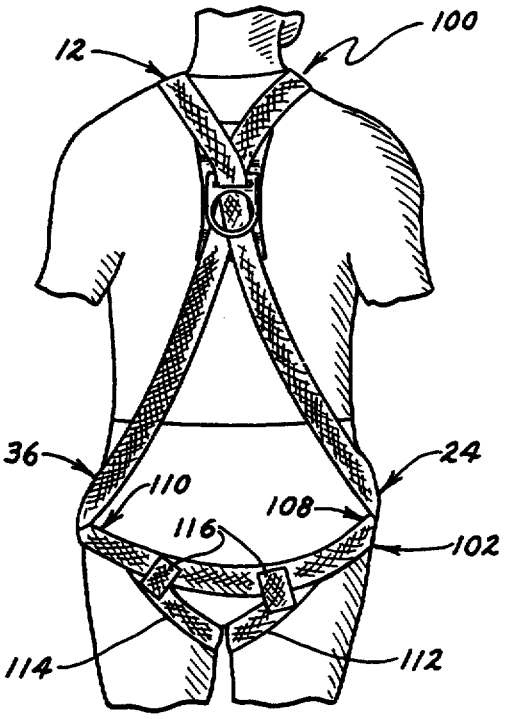
FIG. 8 is a rear elevation of the alternative embodiment of the safety harness illustrated in FIG. 7 in normal use.

With reference to FIGS. 7 and 8, an alternative embodiment 100 of safety harness is illustrated that incorporates the shoulder strap 12 and the waist strap 14 of the main embodiment of safety harness 10, but includes a different form of seat strap 102. Alternative seat strap 102, also known as a European style sub-pelvic support, includes left and right junction rings 104, 106. First and second end regions 24, 36 of shoulder strap 12 are joined as by stitching to right and left junction rings 106, 104, respectively. Further, the first and second ends of waist strap 14 are also joined as by stitching to left and right junction rings 104, 106, respectively. Alternative seat strap 102 is fastened as by stitching at first and second intermediate regions 108, 110 to right and left junction rings 106, 104, respectively. When seat strap 102 is so fastened to right and left junction rings 106, 104, right and left leg portions 112, 114 hang downwardly from the rear portion of safety harness 100. Spacing tabs 116 are stitched to portions of seat strap 102 to ensure the proper location of the right and left leg portions 112, 114, respectively, of seat strap 102 that wrap around the legs of the person P wearing safety harness 100, as illustrated in FIGS. 7 and 8.

To don safety harness 100, the person P adjusts and fastens shoulder strap 12 and waist strap 14 in the same manner as described for the preferred embodiment of safety harness 10, above. However, when adjusting and fastening seat strap 102, person P first reaches between their legs and grasps left leg portion 116 and passes the end of it through left junction ring 104, Then the end of right leg portion 112 is passed through right junction ring 106. The ends of right and left leg portions 112, 114 travel generally in the directions indicated by direction arrows 118 shown in FIG. 7 as seat strap 102 is being adjusted for a proper fit. The end of left leg portion 114 includes an adjustable buckle 120 through which the end of right leg portion 112 is passed to maintain seat strap 102 in a secure, restraining position, as shown in FIGS. 7 and 8.

While the preferred embodiments of the invention have been described, it should be understood that various changes, adaptations, and modifications may be made therein without departing from the spirit of the invention and the scope of the appended claims.

What is claimed is:

1. A safety harness, comprising:

a shoulder strap having a first end region and a second end region;

a waist strap having a first end region and a second end region;

a front slide assembly, through which pass said shoulder strap and said waist strap;

a rear suspension assembly, engaging intersecting intermediate portions of said shoulder strap; and an adjustable seat strap having first and second end regions and first and second intermediate portions, whereby said first and second end regions of said shoulder strap intersect and engage said first and second intermediate portions of said seat strap, respectively, said second end region of said waist strap is releasably attached to said first intermediate portion of said seat strap, said first end region of said waist strap engages said second intermediate portion of said seat strap, said first end region of said shoulder strap is releasably attached to said first end region of said seat strap, said second end region of said shoulder strap is releasably attached to said second end region of said seat strap, and said rear suspension assembly is maintained in a fixed position relative to said seat strap.

2. A safety harness as described in claim 1, wherein: said shoulder strap and said waist strap adjustably engage said front slide assembly, whereby said front slide assembly may be selectively positioned along the height of the front side of the torso of the person wearing the safety harness.

3. A safety harness as described in claim 1, further comprising:

means for adjusting the effective length of said first and second end regions, respectively, of said seat strap.

4. A safety harness as described in claim 1, wherein: said front slide assembly includes means for attaching an item thereto.

5. A safety harness as described in claim 4, wherein: said means for attaching an item to said front slide assembly is a D-ring.

6. A safety harness as described in claim 1, wherein: said first and second end regions of said shoulder strap intersect and engage said first and second intermediate portions of said seat strap by means of interlacing folds in said respective regions of said shoulder strap and said seat strap.

7. A safety harness as described in claim 6, further comprising:

strap retaining means for maintaining in position said interlacing folds of said first and second end regions of said shoulder strap and said first and second intermediate portions of said seat strap.

8. A safety harness as described in claim 7, wherein: said strap retaining means includes threads stitched through said folds in said straps.

9. A safety harness as described in claim 1, further comprising:

means for adjusting the effective length of said shoulder strap.

10. A safety harness as described in claim 9, wherein said shoulder strap further comprises:

a first strap segment having a first end and a second end; and a second strap segment having a first end and a second end.

11. A safety harness as described in claim 10, wherein:

said first end of said first strap segment coincides with said first end region of said shoulder strap and said second end of said second strap segment coincides with said second end region of said shoulder strap.

12. A safety harness as described in claim 11, said means for adjusting the effective length of said shoulder strap comprises:

a shoulder strap adjuster joining said first strap segment and said second strap segment.

13. A safety harness as described in claim 12, wherein:

said second end of said first strap segment is fixedly attached to said shoulder strap adjuster; and said first end of said second strap segment slidably engages said shoulder strap adjuster.

14. A safety harness as described in claim 13, further comprising:

means for adjusting the effective length of said waist strap.

15. A safety harness as described in claim 1, further comprising:

means for adjusting the effective length of said waist strap.

16. A safety harness as described in claim 1, wherein:

said rear suspension assembly is fixedly attached to said intermediate portions of said shoulder strap.

17. A safety harness, comprising:

a shoulder strap having a first end region and a second end region;

a waist strap having a first end region, a second end region, a first strap segment including said first end region of said waist strap and a second strap segment including said second end region of said waist strap;

fastening means for releasably fastening said first strap segment and said second strap segment;

a front slide assembly, through which pass said shoulder strap and said waist strap;

a rear suspension assembly, engaging intersecting intermediate portions of said shoulder strap; and an adjustable seat strap having first and second end regions and first and second intermediate portions, whereby said first and second end regions of said shoulder strap intersect and engage said first and second intermediate portions of said seat strap, respectively, said first end region of said waist strap engages said second intermediate portion of said seat strap, said second end region of said waist strap engages said first intermediate portion of said seat strap, said first end region of said shoulder strap is releasably attached to said first end region of said seat strap, said second end region of said shoulder strap is releasably attached to said second end region of said seat strap, and said rear suspension assembly is maintained in a fixed position relative to said seat strap.

18. A safety harness as described in claim 17, wherein:

said shoulder strap and said waist strap adjustably engage said front slide assembly, whereby said front slide assembly may be selectively positioned along the height of the front side of the torso of the person wearing the safety harness.

19. A safety harness as described in claim 17, further comprising:

means for adjusting the effective length of said first and second end regions, respectively, of said seat strap.

20. A safety harness as described in claim 17, wherein:

said front slide assembly includes means for attaching an item thereto.

21. A safety harness as described in claim 20, wherein:

said means for attaching an item to said front slide assembly is a D-ring.

22. A safety harness as described in claim 17, wherein:

said first and second end regions of said shoulder strap intersect and engage said first and second intermediate portions of said seat strap by means of interlacing folds in said respective regions of said shoulder strap and said seat strap.

23. A safety harness as described in claim 22, further comprising:

strap retaining means for maintaining in position said interlacing folds of said first and second end regions of said shoulder strap and said first and second intermediate portions of said seat strap.

24. A safety harness as described in claim 23, wherein:

said strap retaining means includes threads stitched through said folds in said straps, 25. A safety harness as described in claim 17, further comprising:

means for adjusting the effective length of said shoulder strap.

26. A safety harness as described in claim 25, wherein said shoulder strap further comprises:

a first strap segment having a first end and a second end; and a second strap segment having a first end and a second end.

27. A safety harness as described in claim 26, wherein:

said first end of said first strap segment coincides with said first end region of said shoulder strap and said second end of said second strap segment coincides with said second end region of said shoulder strap.

28. A safety harness as described in claim 27, said means for adjusting the effective length of said shoulder strap comprises:

a shoulder strap adjuster joining said first strap segment and said second strap segment.

29. A safety harness as described in claim 28, wherein:

said second end of said first strap segment is fixedly attached to said shoulder strap adjuster; and said first end of said second strap segment slidably engages said shoulder strap adjuster.

30. A safety harness as described in claim 29, further comprising:

means for adjusting the effective length of said waist strap.

31. A safety harness as described in claim 17, further comprising:

means for adjusting the effective length of said waist strap.

32. A safety harness as described in claim 17, wherein:

said rear suspension assembly is fixedly attached to said intermediate portions of said shoulder strap.

33. A safety harness, comprising:

a shoulder strap having a first end and a second end, said shoulder strap including a first strap segment and a second strap segment;

means for adjusting the effective length of said second strap segment;

a waist strap having a first end and a second end;

means for adjusting the effective length of said waist strap;

a front slide assembly, through which slidably pass in tangential, non-intersecting relation said second strap segment and said waist strap;

a rear suspension assembly, engaging in fixed, intersecting relation said first strap segment and said second strap segment;

a seat strap having first and second end regions and first and second intermediate portions, said first and second ends of said shoulder strap intersect and engage said first and second intermediate portions of said seat strap, respectively, said first intermediate portion of said seat strap being releasably engaged to said second end of said waist strap, said second intermediate portion of said seat strap being fixedly attached to said first end of said waist strap, said first end region of said seat strap being releasably engaged to said first end of said shoulder strap, and said second end region of said seat strap being releasably engaged to said second end of said shoulder strap;

means for adjusting the effective length of said first end region of said seat strap; and means for adjusting the effective length of said second end region of said seat strap.

*34. A safety harness, comprising:*

*a shoulder strap having a first end region and a second end region;*

*a waist strap segment having a first end region and a second end region;*

*a front slide assembly, through which pass said shoulder strap and said waist strap segment;*

*a rear suspension assembly, engaging intersecting intermediate portions of said shoulder strap; and*

*an adjustable seat strap having first and second end regions and first and second intermediate portions, and wherein said first and second end regions of said shoulder strap intersect and engage said first and second intermediate portions of said seat strap, respectively, said second end region of said waist strap segment is releasably attached to said first intermediate portion of said seat strap, said first end region of said waist strap segment engages said second intermediate portion of said seat strap, said first end region of said shoulder strap is releasably attached to said first end region of said seat strap, and said second end region of said shoulder strap is releasably attached to said second end region of said seat strap.*

*35. A safety harness as described in claim 34, wherein: said waist strap segment is a separate strap.*

*36. A safety harness, comprising:*

*a shoulder strap having a first end and a second end, said shoulder strap including a first strap segment and a second strap segment;*

*a waist strap having a first end and a second end;*

*a front slide assembly, through which slidably pass in tangential, non-intersecting relation said second strap segment and said waist strap;*

*a rear suspension assembly engaging in intersecting relation said first strap segment and said second strap segment; and*

*a seat strap having first and second end regions and first and second intermediate portions, said first and second ends of said shoulder strap intersect and engage said first and second intermediate portions of said seat strap, respectively, said first intermediate portion of said seat strap being releasably engaged to said second end of said waist strap, said second intermediate portion of said seat strap being fixedly attached to said first end of said waist strap, said first end region of said seat strap being releasably engaged to said first end of said shoulder strap, and said second end region of said seat strap being releasably engaged to said second end of said shoulder strap.*

*37. A safety harness as described in claim 36, further comprising:*

*means for limiting the range of movement of said rear suspension assembly, whereby said rear suspension assembly is restrained from moving toward the neck of the person wearing the safety harness.*

*38. A safety harness as described in claim 36, further comprising:*

*means for adjusting the effective length of said second strap segment.*

*39. A safety harness as described in claim 36, further comprising:*

*means for adjusting the effective length of said waist strap.*

*40. A safety harness as described in claim 36, further comprising:*

*means for adjusting the effective length of said first end region of said seat strap.*

*41. A safety harness as described in claim 36, further comprising:*

*means for adjusting the effective length of said second end region of said seat strap.*

* * * * *